June 13, 1939. J. U. LEHN ET AL 2,161,874
ANIMAL TRAP
Filed Jan. 6, 1938   2 Sheets-Sheet 1
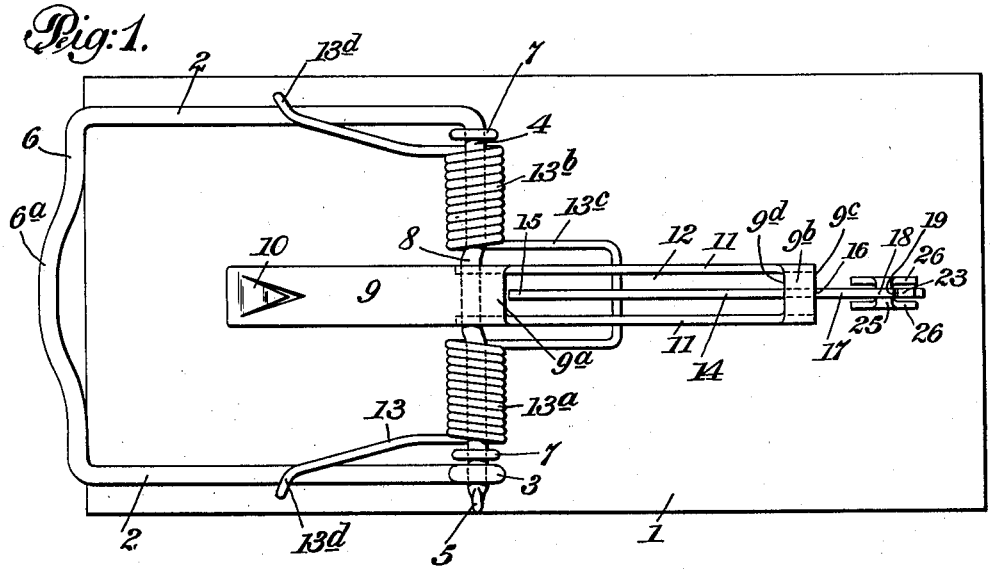
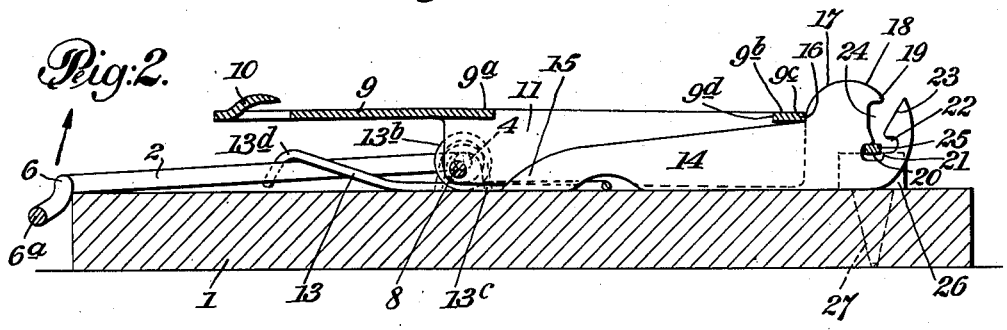
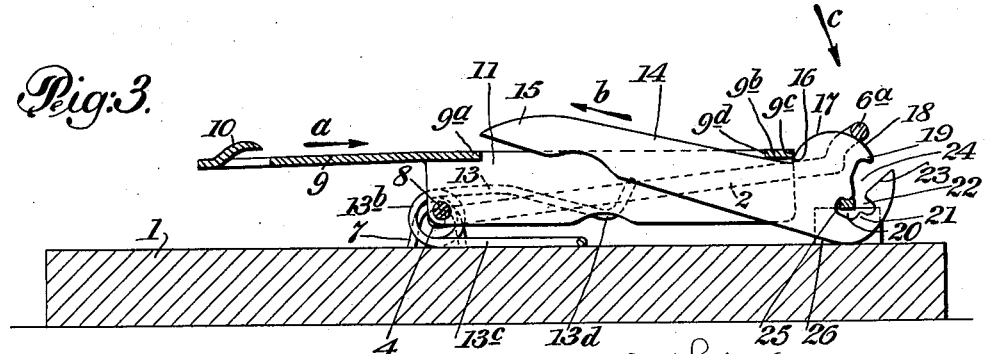

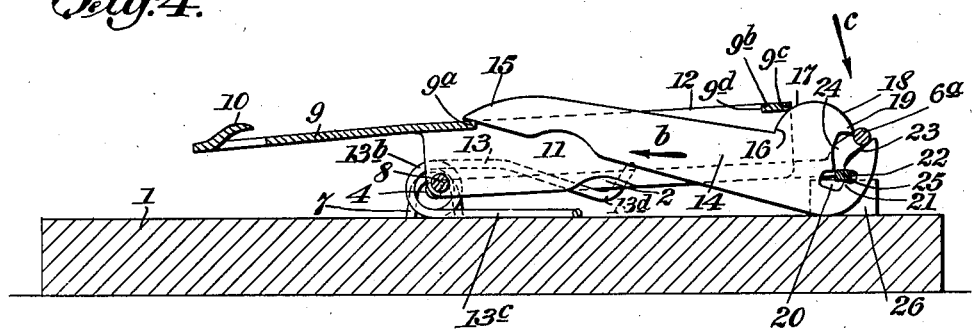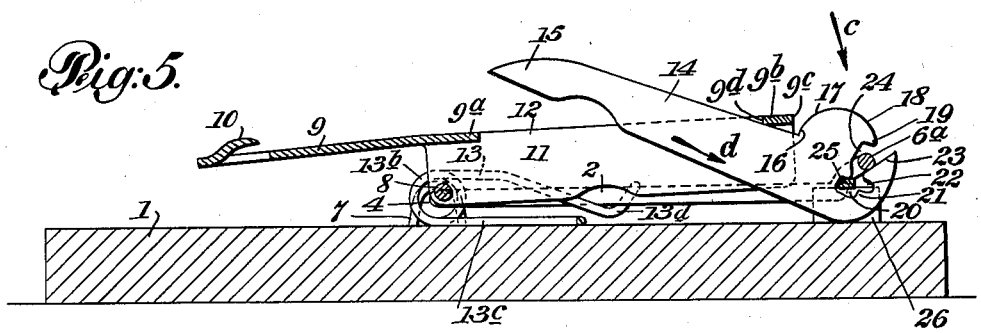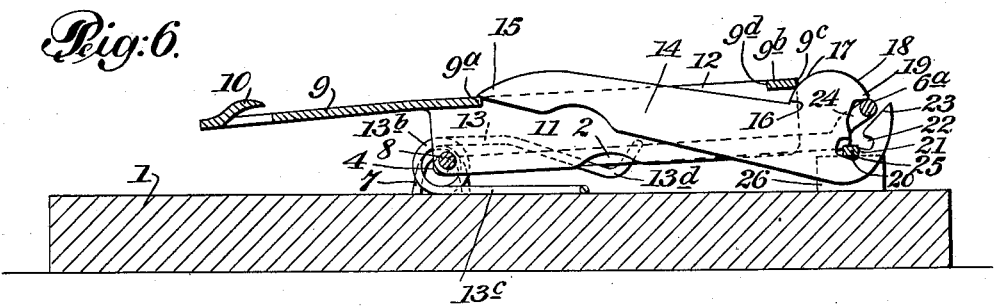

Patented June 13, 1939

2,161,874

UNITED STATES PATENT OFFICE 2,161,874

ANIMAL TRAP

John U. Lehn and Joseph D. Zahm, Lititz, Pa., assignors to Animal Trap Company of America, Lititz, Pa., a corporation of Pennsylvania Application January 6, 1938, Serial No. 183,654

18 Claims. (Cl. 43—83)

Our invention consists in the novel features hereinafter described, reference being had to the accompany drawings, which illustrate one embodiment of the same, selected by us for purposes of illustration, and the said invention is fully disclosed in the following description and claims.

Our invention is an improvement in a self-setting trap intended primarily for catching mice, rats and other small animals. The leading feature of the invention is the provision of a crank or eccentric portion of the pivot rod for the jaw or bail of the trap operatively connected with the bait pedal, provided with a trigger portion, and a cooperating locking plate entirely out of operative relation with the trigger when the trap is in released or sprung position, the parts being so constructed and arranged that the movement of the bail from the released to the set position will effect the elevation of the forward end of the locking plate above the plane of the trigger, and the simultaneous movement of the portion of the bait pedal provided with the trigger in a rearward direction so as to bring the trigger portion beneath the forward end of the locking plate in position to operatively engage the same and hold the trap in set position.

Another feature of the invention is the provision for longitudinal movement of the locking plate with respect to its supporting pivot and the provision of cam surfaces to be engaged by the crossbar of the jaw or bail in setting the trap, so as to first move the locking plate forward to allow the crossbar to pass below the detent on the locking plate, and by a further movement of the bail to effect a slight rearward movement of the locking plate with respect to its pivot, sufficient to bring the detent of the locking plate above and in operative relation with the crossbar of the bail, and thus automatically set the trap. Other features of the invention will be pointed out in the following specification and in the claims forming a part thereof.

Referring to the accompanying drawings,

Fig. 1 is a top plan view of a trap embodying our invention showing it in the released or sprung position.

Fig. 2 is a longitudinal central sectional view of Fig. 1.

Fig. 3 is a view similar to Fig. 2, showing the bail swung over rearwardly toward the locking position and its crossbar engaging one of the cam surfaces of the locking plate after having elevated the forward end of the locking plate and moved the entire bait pedal rearwardly to bring the trigger portion beneath the forward end of the locking plate.

Fig. 4 is a view similar to Figs. 2 and 3 showing the position of the parts after the crossbar of the bail has moved the locking plate forward to pass the locking detent and has engaged the secondary cam surface of the locking plate.

Fig. 5 is a view similar to Fig. 4 showing the crossbar of the bail after it has engaged the secondary cam of the locking plate and moved it rearwardly to bring the locking detent into operative relation with the bail.

Fig. 6 is a view similar to Fig. 5 showing the position of the parts after the crossbar of the bail has been released and placed in engagement with the locking detent in the set position of the trap.

Referring to the drawings, I represents the base plate of the trap which is usually of wood, but may be formed of metal or other suitable material, if desired. It is ordinarily of rectangular shape as shown, but may be of any suitable form. 2 represents the bail or jaw of the trap, which is conveniently formed of a single piece of round wire, one end of which is formed into an eye, indicated at 3, the other end portion forming the pivot 4 of the bail and having its extreme end passed through the eye 3 and upset, as indicated at 5, although this particular construction is not essential. 6 represents the striking crossbar of the trap, the central portion of which, indicated at 6a, is preferably bent outwardly and downwardly to pass over the end edge of the base 1. The bail is pivotally connected with the base in any suitable manner, and in this instance we have shown staples 7—7 embracing the crossbar 4 adjacent to its outer ends. The central portion of the crossbar 4 is provided with a crank or eccentric portion, in this instance a crank portion, indicated at 8, upon which the bait pedal is in this instance pivoted. 9 represents the bait pedal as a whole, provided with a bait carrying portion 10 at its forward end, the rear end being formed so as to carry a counterbalance or weighted portion, which is conveniently formed by stamping the bait pedal out of suitable sheet metal and bending downwardly its side portions to form parallel walls 11, the upper part of the bait pedal between the parallel walls 11 being preferably cut away to form a slot 12. While it is not essential, it is convenient to provide the forward portions of the lateral walls 11 with apertures through which the eccentric or crank portion 8 of the jaw pivot 4 extends, thus pivotally connecting the bait pedal to the base. The jaw or bail is provided with a retracting spring 13 in any usual or preferred manner. In this instance we have shown the spring as comprising two coils 13a and 13b connected by a loop 13c which engages the base 1, the spring being in this instance composed of a single piece of wire, the end portions of which are provided with hook portions 13d engaging the arms of the bail 2. The bait pedal 9 is provided with a trigger portion 9a at the forward end of the slot 12 and slightly in rear of the pivot shaft 4 of the jaw. The bait pedal is also provided at its rear end with a transversely extending portion or crossbar 9b connecting the upper ends of the parallel walls 11 and having a rear wall 9c and an inner wall 9d spaced therefrom a short distance toward the pivot shaft and forming in this instance the rear end of the slot 12.

The locking plate is indicated at 14 and comprises a forwardly extending portion 15 which coacts with the trigger portion 9a of the bait pedal immediately forward of the open slot 12. The plate 14 lies preferably between the depending walls 11 of the bait pedal, constituting the counterbalance, and the said plate 14 is loosely pivoted at its rear end on a pivot 25 conveniently formed integral with the lateral guiding plates 26, which tend to hold the plate 14 perpendicularly to the base and guide it loosely in its movements, the plates 26 being provided with prongs 27 for attaching it to the base. The particular construction of this pivotal support, however, forms no part of the present invention.

The rear end of the plate 14 is wider vertically than the forward end and forms a shoulder, indicated at 16, which is immediately in rear of the rear end 9c of the bait pedal when the parts are in their released position, as shown in Fig. 2, for example. The upper edge of the locking plate 14 in rear of the shoulder 16 comprises a curved portion 17 extending upwardly therefrom and an inclined cam portion 18, the outer end of which forms the locking detent 19.

This wider rear portion of the locking plate is provided with an open vertically disposed slot 24 extending downwardly to a pivotal aperture 20 having a shoulder 21 in the rear thereof and a rearwardly extending recess 22 above said shoulder. Immediately above the recess 22 is a downwardly and forwardly inclined cam 23 the purpose of which will be further described.

Assuming the parts to be in the released position shown in Figs. 1 and 2, the operation of setting the trap, which is effected solely by swinging the jaw 2 from released to set position, takes place as follows. It will be noted, especially from Fig. 1, that in the released position the trigger 9a and the forward end or trigger engaging portion of the locking plate 14 are separated so that the trigger 9a is not in position to cooperate with the locking plate and is not within its range of movement. As the jaw 2 is swung rearwardly the eccentric portion 8 of the jaw pivot 4 effects a bodily rearward movement of the bait pedal in the direction indicated by the arrow a in Fig. 3. The rear portion 9c of the bait pedal will engage the shoulder 16 of the locking plate 14 and rock it on its pivot, thereby raising the forward end 15 above the level of the trigger 9a and simultaneously move the trigger portion 9a into cooperative range with respect to the locking plate and beneath the forward end 15 thereof, as clearly shown in Fig. 3. As the locking plate 14 is raised, the forward edge 9d of the crossbar 9b will engage the upper edge of the locking plate, as also indicated in Fig. 3, and lift the terminal edge 9c out of engagement with the shoulder 16 and into engagement with the curved portion 17 immediately above the shoulder. At the same time the central portion 6a of the crossbar 6 will engage the cam portion 18 of the locking plate and force the locking plate forward with respect to its pivot 25 in the direction of the arrow b in Fig. 3.

As will be noted in Fig. 3, in the uptilted position of the locking bar the recess 22 in the locking plate is substantially in alignment with the pivot 25, and the shoulder 21 at the rear of the pivotal aperture 20 is below the level of the pivot 25. As the central portion 6a of the crossbar slides down the inclined cam portion 18 of the locking plate, in the direction of the arrow c Fig. 3, the rear edge 9c of the bait pedal will slide upward over the curved surface 17 of the locking plate 14. The entire locking plate is shifted forward so that the notch or recess 22 on the rear side of the slot therein engages the pivot and the crossbar is thus enabled to pass below the locking detent 19, as clearly indicated in Fig. 4, and into engagement with the inclined cam 23 at the rear of the slot 24. The further downward movement of the portion 6a of the crossbar in the direction of the arrow c Fig. 4, acting on the inclined cam face 23, moves the locking plate bodily rearward in the direction of the arrow d Fig. 5, carrying the forward end of the pivotal aperture 20 into contact with the pivot 25, and at the same time carrying the locking detent 19 above the central portion 6a of the crossbar, all as clearly shown in Fig. 5. The locking lever may be slightly rocked so as to move its forward end upwardly, as shown in that figure, but this is not essential and merely assists in carrying the locking detent well over the central portion 6a of the crossbar 6.

The jaw is now released and the crossbar moves upwardly under the action of the spring, or springs, bringing the central portion 6a of the crossbar into locking engagement with the locking detent 19, and bringing the forward end 15 of the locking bar into operative engagement with the trigger 9a of the bait pedal. This upward movement of the jaw slightly raises the rear end of the locking blade and seats the pivot 25 in the pivotal aperture 20 forward of the shoulder 21, so that no rearward movement of the locking plate thereafter will be permitted until after the trap is sprung.

This is the set position of the trap, which is clearly shown in Fig. 6. Obviously any downward movement of the forward end of the bait pedal 9, as by an animal nibbling at the bait, will tilt the bait pedal on its pivotal support and cause its trigger portion 9a to disengage the forward end of the locking plate which drops off the trigger and frees the bail or jaw from engagement with the locking detent, permitting the jaw to be closed by its retracting spring or springs. The parts will then be in the position shown in Figs. 1 and 2.

From the foregoing description it will be clear that when the parts of the trap are in released position, the trigger is out of the operative range of movement of the forward end of the locking plate, and the swinging of the bail or jaw from its released to its set position first raises the forward end of the locking plate above the trigger and simultaneously moves the bait pedal rearwardly through the crank or eccentric portion of the pivot shaft 4, thereby bringing the trigger portion of the bait pedal below and within the range of movement of the forward end of the locking plate, the locking plate being loosely mounted with respect to its pivot and being shifted forwardly to enable the crossbar of the bail to pass below the locking detent and then being moved rearwardly to place the bail under the control of said detent.

In setting traps in which the locking plate is on a fixed pivot and has its forward end in range of the trigger portion of the bait pedal at all times, it not infrequently happens that the forward end of the locking plate becomes accidentally engaged with the trigger before an attempt is made to set the trap, in which case the trap cannot be set without first actuating the bait pedal to release the forward end of the locking plate from engagement with the trigger, and injury to the hands of the operator may thereby result, by the premature releasing of the jaw. This cannot happen with our trap, as the interengaging parts of the locking plate and bait pedal are normally held out of possibility of operative engagement until the jaw has swung over into position to be engaged by the locking plate, and both are brought into position for engagement by the rearward bodily movement of the bait pedal under the action of the crank or eccentric, operated by the swinging of the bail. The setting of the trap is therefore rendered entirely automatic and entirely safe.

In the specification and in the following claims wherever the expression "eccentric means" is used, it is to be intended as including either an eccentric or a crank having portions eccentric to the axis of a rotary part, operated by the swinging of the jaw from released position in a direction toward set position or other equivalent means.

What we claim and desire to secure by Letters Patent is:

1. In a trap, the combination with a pivoted spring actuated jaw, a pivoted locking plate having a locking detent for engaging the jaw, and a trigger engaging portion, a pivoted bait pedal having a trigger portion out of the range of movement of the trigger engaging portion of the locking plate in the released position of the trap, and means operated by the movement of the jaw to set position, and operatively connected with the bait pedal for bringing the said trigger into coacting range with the trigger engaging portion of the locking plate.

2. In a trap, the combination with a pivoted spring actuated jaw, a pivoted locking plate having a locking detent for engaging the jaw, and a trigger engaging portion, a pivoted bait pedal having a trigger portion out of the range of movement of the trigger engaging portion of the locking plate in the released position of the trap, and means operated by the movement of the jaw to set position, and operatively connected with the bait pedal and the locking plate for raising the trigger engaging portion of the locking plate and moving said trigger into position to be engaged by the same, to set the trap.

3. In a trap, the combination with a pivoted spring actuated jaw, a pivoted locking plate having a locking detent for engaging the jaw, and a trigger engaging portion, a pivoted bait pedal having a trigger out of range of said trigger engaging portion of the locking plate in the released position of the trap, and rotary eccentric means operated by the movement of the jaw to set position for bringing the trigger and the trigger engaging portion of the locking plate into operative relation.

4. In a trap, the combination with a pivoted spring actuated jaw, a pivoted locking plate having a locking detent for engaging the jaw, and a trigger engaging portion, a pivoted bait pedal having a trigger out of range of said trigger engaging portion of the locking plate in the released position of the trap, and rotary eccentric means operated by the movement of the jaw to set position, and operatively connected with the bait pedal, for moving it in a direction to bring the trigger into coacting range of the trigger engaging portion of the locking plate.

5. In a trap, the combination with a pivoted spring actuated jaw, a pivoted locking plate having a locking detent for engaging the jaw, and a trigger engaging portion, a pivoted bait pedal having a trigger out of range of said trigger engaging portion of the locking plate in the released position of the trap, and rotary eccentric means operated by the movement of the jaw to set position, and operatively connected with the bait pedal and with the locking plate to raise the trigger engaging portion of the locking plate and move the trigger into position to engage the locking plate and hold the trap in set position.

6. In a trap, the combination with a pivoted spring actuated jaw, a pivoted locking plate having a locking detent for engaging the jaw, and a trigger engaging portion, a pivoted bait pedal having a trigger portion out of the range of movement of the trigger engaging portion of the locking plate in the released position of the trap, said bait pedal having a portion to engage the locking plate and raise its trigger engaging portion, and a rotary eccentric means operated by the movement of the jaw to set position and operatively connected with the bait pedal for effecting the raising of the trigger engaging portion of the locking plate and placing said trigger in operative relation therewith, to set the trap.

7. In a trap, the combination with a pivoted spring actuated jaw, a loosely pivoted locking plate capable of longitudinal movement with respect to its pivot and having a locking detent for engaging the jaw, and cam faces for engaging said jaw and effecting longitudinal movements of the locking plate, a pivoted bait pedal having a trigger portion out of range of the locking plate in the released position of the trap, and a rotary eccentric part operated by the movement of the jaw to set position, and operatively connected with the bait pedal for bringing the trigger portion thereof within coacting range of the locking plate when the trap is set.

8. In a trap, the combination with a pivoted spring actuated jaw, a loosely pivoted locking plate capable of longitudinal movement with respect to its pivot and having a locking detent for engaging the jaw, and cam faces for engaging said jaw and effecting longitudinal movements of the locking plate, a pivoted bait pedal having a trigger portion out of range of the locking plate in the released position of the trap, said bait pedal having a portion for engaging the locking plate and raising the trigger engaging portion thereof, and rotary eccentric means operated by the movement of the jaw to set position, and operatively connected with the bait pedal for effecting the raising of the trigger engaging portion of the locking plate and placing the trigger in operative relation therewith, to set the trap.

9. In a trap, the combination with a swinging spring actuated jaw, a rotary pivoted shaft operatively connected with said jaw and provided with an eccentric portion, a pivoted locking plate having a locking detent for engaging the jaw, and a trigger engaging portion, a bait pedal pivoted on said eccentric portion of said pivoted shaft and having a trigger out of range of the trigger engaging portion of the locking plate in the released position of the trap, the movement of said jaw into set position rotating said eccentric portion of said shaft and moving the bait pedal to bring said trigger into coacting range with the trigger engaging portion of the locking plate.

10. In a trap, the combination with a swinging spring actuated jaw, and a pivoted shaft connected therewith and provided with an eccentric portion, a loosely pivoted locking plate capable of longitudinal movement with respect to its pivot and provided with a locking detent for engaging the jaw, cam portions for engaging said jaw to effect longitudinal movement of the locking plate, and a trigger engaging portion, a bait pedal pivoted on said eccentric portion of said shaft, and having a trigger out of range with the trigger engaging portion of the locking plate in the released position of the trap, and a portion for engaging said locking plate to raise the trigger engaging portion thereof, the movement of said jaw to set position effecting the raising of the trigger engaging portion of the locking plate and the movement of said trigger into operative relation therewith, to set the trap.

11. In a trap, the combination with a swinging spring actuated jaw, a loosely pivoted locking plate having a locking detent and being provided adjacent to said pivot with a vertically disposed slot having jaw engaging cam portions on opposite sides of the slot to effect the longitudinal movement of said locking plate, a rotatable shaft connected with said jaw and provided with an eccentric portion, a bait pedal pivotally mounted on the eccentric portion of said shaft and provided with a trigger out of range of the trigger engaging portion of the locking plate in the released position of the trap, and having a portion for engaging the locking plate to raise the trigger engaging portion thereof, the movement of the jaw to set position effecting the movement of the bait pedal to raise the trigger engaging portion of the locking plate and place the trigger in operative relation therewith to set the trap, said jaw having portions for engaging said slot, and cam portions of the locking plate, for placing said jaw in control of said detent.

12. In a trap, the combination with a pivoted spring actuated jaw, a pivoted locking plate having a locking detent for engaging the jaw, and a trigger engaging portion, a pivoted bait pedal provided with a trigger for engaging the locking plate, and a rotary eccentric means operated by the movement of the jaw from released position toward set position, and operatively connected with the locking plate for raising it into position to engage the trigger.

13. In a trap, the combination with a pivoted spring actuated jaw, a loosely pivoted locking plate capable of longitudinal movement with respect to its pivot, and having a locking detent for engaging the jaw, and a trigger engaging portion, a pivoted bait pedal having a trigger portion out of range of the locking plate in the released position of the trap, and rotary eccentric means operated by the movement of the jaw from released position toward set position for bringing the trigger portion of the bait pedal and the trigger engaging portion of the locking plate within coacting range.

14. In a trap, the combination with a pivoted spring actuated jaw, a pivoted locking plate having a locking detent for engaging the jaw, and a trigger engaging portion, a pivoted bait pedal coacting therewith and having a trigger portion, and means engaging at least one of said coacting parts and operated by the movement of the jaw for holding said trigger portion and the trigger engaging portion of the locking plate out of coacting range in the released position of the trap, the movement of the jaw toward set position bringing said trigger and trigger engaging portion of the locking plate into coacting range.

15. In a trap, the combination with a pivoted spring actuated jaw, a pivoted locking plate having a locking detent for engaging the jaw, and a trigger engaging portion, a pivoted bait pedal coacting therewith and having a trigger portion, and rotary eccentric means operated by the movement of the jaw engaging one of said coacting parts and operated by the movement of the jaw and constructed to hold said coacting parts out of set position with respect to each other until the jaw is in position to be engaged by the locking plate in setting the trap.

16. In a trap, the combination with a pivoted spring actuated jaw, a pivoted locking plate having a locking detent for engaging the jaw, and a trigger engaging portion, a pivoted bait pedal coacting therewith and having a trigger portion, a pivoted shaft for said jaw, eccentric means on said shaft operatively connected with one of said coacting parts, holding said parts out of coacting range in the released position of the trap, and operative by the movement of the jaw toward set position to bring said coacting parts into coacting range.

17. In a trap, the combination with a pivoted spring actuated jaw, having a transverse crossbar at its outer end, a pivoted locking plate having a locking detent and cam portions for engaging said bar, and having a trigger engaging portion, a pivoted bait pedal coacting therewith having a trigger portion, and eccentric means operated by the movement of the jaw toward set position and operatively connected with said locking plate and constructed to hold said coacting parts out of set position with respect to each other until the crossbar of said jaw is in position to be engaged by the locking plate, in setting the trap.

18. In a trap, the combination with a pivoted spring actuated jaw having a transverse crossbar at its outer end, a pivoted locking plate having a locking detent and cam portions for engaging said bar, and having a trigger engaging portion, a pivoted bait pedal coacting therewith and having a trigger portion, and eccentric means operated by the movement of the jaw operatively engaging the said bait pedal and operatively connected with the locking plate and holding said coacting parts out of set position with respect to each other until the crossbar of the jaw is brought into position to be engaged by the locking plate, in setting the trap.

JOHN U. LEHN.
JOSEPH D. ZAHM.